June 11, 1963  T. J. SCARNATO ETAL  3,092,947
YIELDABLE PENDULUM MOWER MOUNTING
Filed April 5, 1961  2 Sheets-Sheet 1

INVENTORS.
Thomas J. Scarnato
Robert A. Johnson
Paul O. Pippel
Atty.

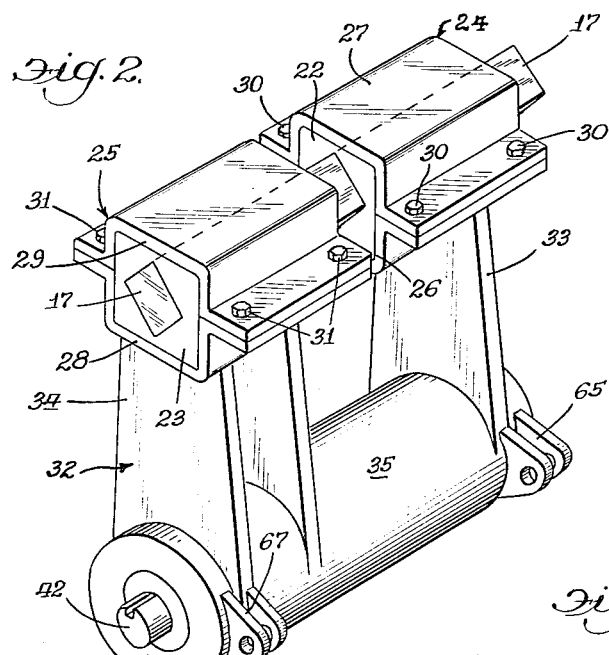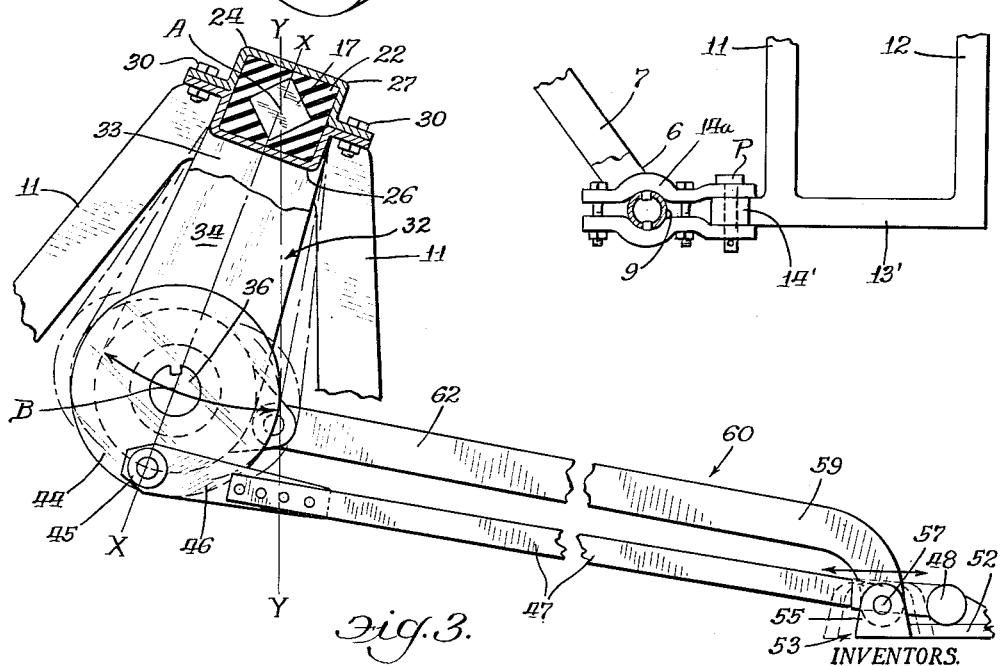

United States Patent Office 3,092,947
Patented June 11, 1963

3,092,947
YIELDABLE PENDULUM MOWER MOUNTING
Thomas J. Scarnato, Park Ridge, and Robert A. Johnson, Downers Grove, Ill., assignors to International Harvester Company, Chicago, Ill., a corporation of New Jersey
Filed Apr. 5, 1961, Ser. No. 100,912
14 Claims. (Cl. 56—25)

This invention relates to mowers of the reciprocating type and more specifically to a novel mounting therefor which not only controls vibrations but also enhances the cutting action of the mower.

In pitman type mowers which incorporate a crank-driven pitman which is connected to the sickle, various problems have developed with the acceleration in the reciprocation speed and the speed of advance of the mower over the field in that excessive vibrations develop which not only violently shake the tractor and the mower mounting parts, but, in effect, so jar the tractor that it is difficult for the driver to operate the same which, in turn, promotes excessive driver fatigue. Further, the structure quickly deteriorates because of the excessive pounding to which it is subjected.

The invention contemplates a novel mounting of the entire mower structure including the cutting mechanism and the coupling frame therefor by means of which it is mounted on an associated support structure, the mounting being in the form of a pendulum support which permits swinging movements of the cutter bar and mounting frame therefor longitudinally of the cutting mechanism whereby the cutter bar of the reciprocating mower is caused to oscillate lengthwise, which action has been found to promote cutting and dislodgment of the material from the mower to prevent its plugging when the mower cuts through rank and normally difficult-to-cut material.

A further object of the invention is to provide such a novel mower which comprises a pendulum support including a yieldable connection between the support and the supporting framework whereby the pendulating support oscillates about a fore-and-aft axis, the lower end of the support providing a journal for a drive to a crank from the associated tractor, the axis of the drive being substantially parallel to the axis of pendulation of the support, but offset laterally with respect to a vertical plane passing through the axis of the oscillation of the support to engender swinging motion in the pendulating support and to preclude direct vertical loading or radial loading into a yieldable mounting between the pendulating support and rigid supporting structure carried by the tractor.

A still further object of the invention is to provide a novel mounting in which the crank structure is accommodated free swinging movements about a generally horizontal axis extending substantially normal to the center line of the mower whereby any unbalance generated in the system is controlled through restricted or resisted swinging movements of the crank drive and associated parts.

These and other objects and advantages inherent in and encompassed in the invention will become more readily apparent from the specification and the drawings wherein:

FIGURE 2 is an enlarged perspective view of the pendulating support and mounting thereof;

FIGURE 3 is a broken-apart rear view sub-assembly taken on a smaller scale of the pendulating support and coupling frame assembly; and FIGURE 4 is a fragmentary side elevational view on a reduced scale of the support mounting shown partially in section.

Figure 1:
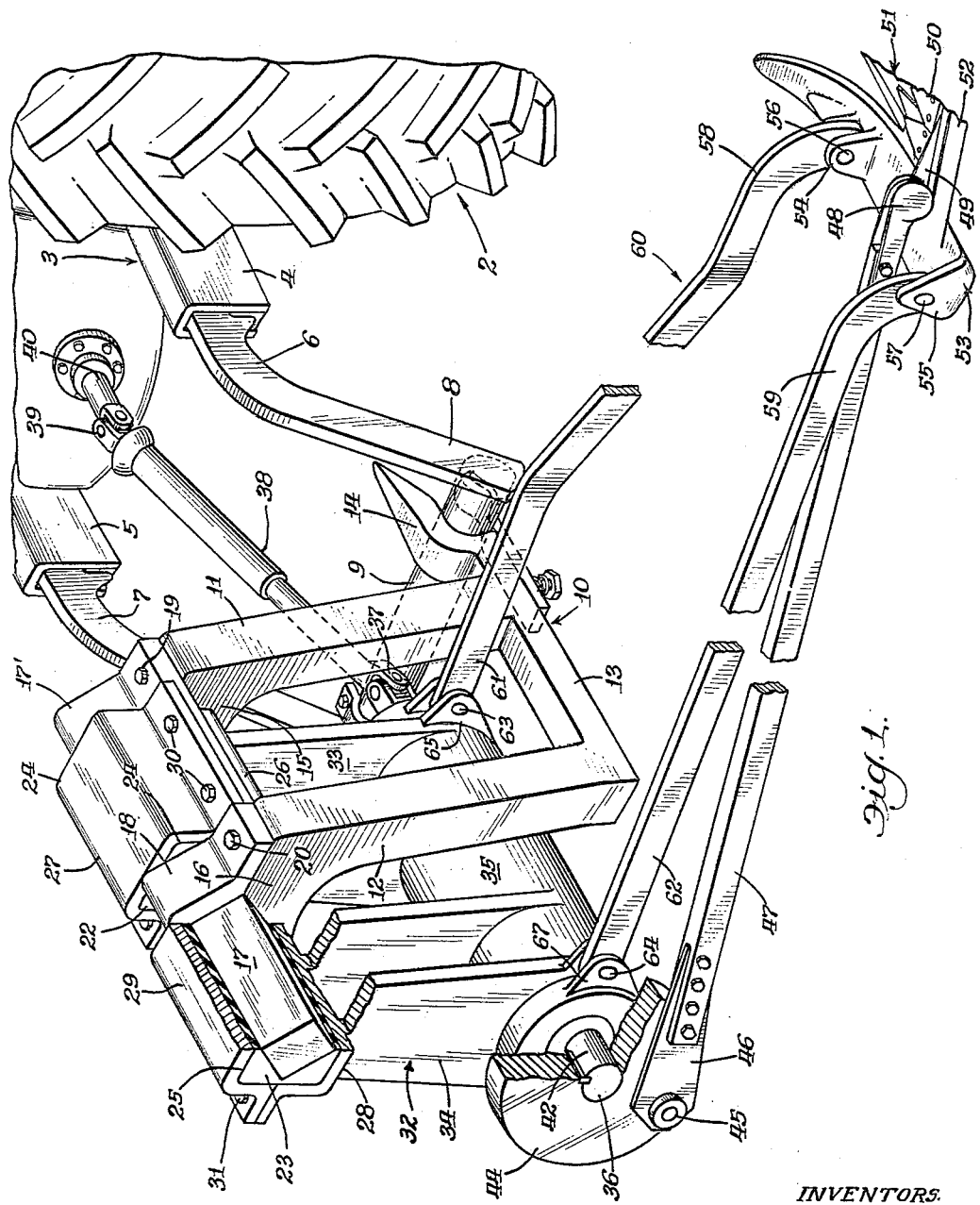
FIGURE 1 is a broken-apart perspective view partially in section of the novel mower mounting shown in association with the tractor fragmentarily shown.

Describing the invention in detail and having particular reference to the drawings, there is shown fragmentarily a tractor generally designated 2 which comprises a hitch frame structure 3 which is preferably the type shown in U.S. Patent 2,779,260 and comprises a pair of sockets 4 and 5 into which telescope the points 6 and 7 of the drawbar frame 8 which includes a transverse beam member 9 interconnecting the arms 6 and 7. The mower frame support structure generally designated 10 comprises fore-and-aft spaced standards including a front standard 11 and rear standard 12 interconnected along their lower edges by a fore-and-aft extending bottom beam portion 13 on the rightward side, which is integrated at its forward end with suitable clamping means 14 which clamps to the cross beam member 9 of the drawbar frame structure and on the leftward side with a beam 13' which provides an ear 14' pivoted on pin P on a vertical axis to clamps 14a secured to beam 9 and accommodating break-away movement of the mower. The upper ends of the members 11 and 12 provide clamping portions 15 and 16 respectively which are underposed with respect to a support shaft 17 which extends substantially horizontally in fore-and-aft direction. The clamp portions 15 and 16 cooperate with clamps 17' and 18 which overlie the same and over the substantially square or polygonal support rod or beam 17. The members 17' and 18 are secured to the clamp portions 15 and 16 by means of the bolts 19 and 20 and secure the same rigidly thereto. The member 17 supports sleeves 22 and 23 of yieldable material thereon, such as rubber or other elastomer substance, which respectively are tightly clamped in substantially square sockets 24 and 25 which are developed between the clamp portions 26, 27, and 28, 29 which snugly surround the sleeves of yieldable material 22 and 23. It will be seen that the clamp portion 27 is secured to the clamp portion 26 by means of bolts 30 and that similarly the clamp portion 29 is secured to the portion 28 by bolts 31.

The pendulating support generally designated 32 comprises fore-and-aft spaced arm structures 33 and 34, the arm structure 33 being integrated at its upper end with the lower clamp member 26 and the rear arm structure 34 being integrally united with the clamp portion 28. The forward and rear arm structures are integrally united with a tubular lower end portion 35 which provides a journal for the power output shaft 36 which at its forward end is connected through the universal joint 37 to a power drive shaft 38, the shaft 38 being suitably connected through universal joints 39 to the power take-off shaft 40 of the tractor 2. The rear extremity 2 of the drive shaft 36 projects rearwardly of the pendulating support 32 and is connected to crank wheel 44 which has no counterweight as is common in similar previous drives but includes a wrist pin 45 connected to the inner end 46 of a diagonally downwardly and outwardly extending pitman 47, the outer end of the pitman 47 having a clamping connection as at 48 to the sickle-head 49 of a knife or sickle section 50 of the mower generally designated 51, the sickle 50 reciprocating within and supported by the mower bar 52 which is connected at its inner end to the inner shoe structure 53. The shoe structure 53 has a pair of upstanding ears 54 and 55 pivoted on a substantially horizontal fore-and-aft axis as at 56 and 57 to the outer ends of the front and rear arms 58 and 59 of the coupling frame generally designated 60. The inner ends 61 and 62 of the beam members 58 and 59 of the coupling frame 60 are pivoted as at 63 and 64 on a substantially horizontal fore-and-aft extending axis generally parallel to the axis of the pins 56, 57 and to the shaft 42, as well as the shaft 17. The end 61 is connected by pin 63 to ears 65 formed integral with the side of the tubular portion 35 of the pendulating member adjacent to its forward end, and the end 62 is connected by pin 64 to outstanding ears 67 which project from one side of the member 35 adjacent the rear end thereof in axial alignment with the ears 65.

It will be noted that in normal position the center line or axis of the shaft 17 as indicated at A and the center line or the axis of the crankshaft 42 as indicated at B is not in vertical alignment. In other words, the plane X—X is angularly related to the vertical plane Y—Y by the angle that the axis B is offset in a stubbleward direction with respect to the axis A. This is for the purpose of inducing a pendulating action, as seen in FIGURE 3, of the arm structure 60 and the mower pursuant to and in consequence of unbalancing moments generated due to rotation of the crank 45 and the mass attached thereto, namely the pitman, etc. It will be readily realized that the entire mower structure in being suspended for swinging movement about a fore-and-aft axis will reciprocate the mower bar along the ground or on the grass stubble at the same time that the sickle is reciprocating back and forth on the mower bar. It has been found that this arrangement substantially isolates the vibration generated due to the unbalancing forces, and, at the same time, by reciprocating the entire mower assembly that the cutter bar tends to shake off the crops which are falling over the mower bar as they are being cut by the sickle and to shake the same loose so that they do not become tangled in the cutting mechanism.

It will be readily realized that the extent of the yieldable connection is substantially the width of the support frame structure 60 and that the arrangement of the square shaft 17 within the square tubular portions of the mounting brackets of the pendulating arm structure is such that the sides of the shaft 17 extend diagonally across the corners of the brackets wherein the bulk of the resilient material is located. The resilient material is in complementary engagement with the shaft 17 and with the sides of the associated tubular portion of the bracket so that there is no slippage between the shaft and the pendulating arm and all the motion is resisted through deformation or yielding action of the resilient material principally in shear.

Also, by offsetting the axis of rotation of the crank with respect to the axis of mounting of the pendulating structure compressive forces on the resilient material are almost entirely eliminated and the resilient material is load in torsion. This conversion of the direction of the moment acting on the resilient material obtains control of longitudinal oscillation of the entire cutter mechanism and tends to reduce the vertical force components.

It will be appreciated that only one form of the invention has been described and that other forms of the invention will become readily apparent to those skilled in the art within the scope of the appendant claims.

What is claimed is:

1. In a mower, the combination of an ambulatory support member, a coupling frame member extending laterally from the support, a pendulum structure member extending between the support member and frame member, means providing connections between the support member and structure member and between the frame member and structure member on vertically and laterally offset generally parallel axes, at least one of said connections including yieldable flexible material interposed between respective members resisting relative swinging movements therebetween, a mower connected to the frame member and having parts reciprocal transversely of said axes, and a driving train for reciprocating at least one of said parts and including crank means mounted on said pendulum member on an axis generally parallel to said axes and displaced laterally with respect to a vertical plane through the axis of the connection of said pendulum structure member with the support member, and pitman means connecting the crank means with at least one of said parts.

2. The invention according to claim 1 and the axis of the crank means being disposed below the axis of connection of the pendulum structure member to said support member.

3. The invention according to claim 1 and said one connection further including a substantially square shaft and a substantially square tube, the shaft connected to one of the members and the tube to the other, and said yieldable material being elastomer and interposed between the shaft and tube.

4. In a mower, a support, a mower coupling frame extending laterally therefrom, a pendular member suspending the frame from the support, a reciprocating type mower extending lengthwise laterally from the frame and connected thereto, resilient means interposed between said support and member yieldably restraining swinging movement of the frame and member lengthwise of the mower, and a drive for the mower including a flywheel crank mounted on the member and disposed with its axis of rotation offset from the axis of pendulation of the support about said resilient means.

5. In a mower, a support frame having a fore and aft extending member, a pendular structure having lower and upper ends and said upper end sleeved over said member, resilient material interposed between said upper end of said structure and said member and yieldably holding said structure with said lower end thereof offset laterally from a vertical plane passing through the axis of pendulation of said structure, a drive shaft rotatably supported in said lower end generally parallel to said member and having a forward end including means for connection to a power take-off of an associated tractor and having a rear end extending rearwardly of said structure, a crank wheel having no counterweight mounted on said rear end and having a crank, a pitman having one end rotatably connected to the crank and extending laterally diagonally downwardly with respect to said member and having an outer end, a reciprocating mower having a part connected to the outer end of the pitman in longitudinal extension thereof, said mower having another part supporting the first-mentioned part, and a coupling frame connected to said other part and to said structure on axes generally paralleling said member.

6. In a mower, a support structure including a pair of fore-and-aft spaced arch shaped members having a forward portion with means for connection to associated draft means, said members having upper ends which clamp sockets, a supporting elongated bar extending over said members and clamped therein, a supported structure having embracing means sleeved over the bar and depending therefrom, resilient means interposed between said embracing means and said bar resisting swinging movement therebetween, and mower drive means supported from said supported structure below said bar.

7. In a mower mounting, the combination of a supporting structure having a plurality of fore-and-aft spaced arch members each including an upper portion and a pair of legs depending from the upper portion, a fore-and-aft extending element connected to said upper portions, a supported structure having a fore-and-aft extending lower end, a journal portion generally paralleling said element and disposed between the legs of said arch members and having upwardly extending portions intercalated with said members and having upper end resilient means snugly embracing said element and yieldably resisting swinging movements of the supported structure, said supported structure having means for attachment to an associated laterally extending cutter mechanism and providing a support in said journal portion of an associated mower crank drive.

8. In a mower, the combination of a supporting and a supported structure, means providing a yieldable connection therebetween accommodating relative swinging movement therebetween on a generally horizontal forward-rearwardly extending axis, a mower drive transmission including a shaft carried on the supported structure on an axis offset from and generally paralleling the said axis, a crank connected to the shaft for rotation about the axis of the shaft and having a crank element offset from the axis of the shaft, a reciprocating sickle driving pitman connected to said crank and extending generally normal to the aforesaid axes and movable in a plane generating inertia forces oscillating said supported structure about said yieldable connection.

9. In a mower mounting for a tractor having draft hitch means including a transverse element, a supporting structure mounted upon the element and having a generally horizontal member extending lengthwise of the tractor, a supported structure extending vertically from said member, means yieldably resisting relative swinging movement between said supported structure and said member about a generally horizontal fore-and-aft axis, and a reciprocating mower mounted wholly upon the supported structure and having operational movement substantially normal to said axis and imposing reactive forces upon said supported structure in pendulating the same about said axis.

10. In a mower mounting, a supporting structure, a supported structure having resilient means interconnecting said structures for yieldable swinging movement of the supported structure about a given generally horizontal axis, and a reciprocating mower assembly supported at one end from said supported structure and at the other end from the ground, said mower having parts operative in planes substantially normal to reactive loads upon the supported structure in pendulating the same about said axis.

11. The invention according to claim 10 and said connection between the mower and said supported structure being disposed at one side of the vertical plane extending through said axis.

12. The invention according to claim 8, and a tractor mounting said supporting structure rearwardly thereof, said tractor having a rearwardly extending power take off, and a flexible driving connection between said power take off and said shaft.

13. The invention according to claim 10, and said supporting and supported structure presenting generally flat surfaces, and said resilient means comprising elastomer material stressed therebetween, and means for driving the mower comprising a pitman connected to one of said parts of the mower and a crank connected to the pitman and mounted directly from said supported structure below and at one side of said axis whereby upon rotation of the crank vertical and horizontal forces effect pendulating movements of said supported structure, said supported structure being an integral member between said crank and said resilient means.

14. The invention according to claim 10, and said supported and supporting structure having telescoping quadrilateral portions, and said resilient means comprising elastomer material between said portions.

References Cited in the file of this patent
UNITED STATES PATENTS

| | | |
|---|---|---|
| 2,311,095 | Simpson et al. | Feb. 16, 1943 |
| 2,495,986 | Schroeppel | Jan. 31, 1950 |
| 2,699,025 | Goss | Jan. 11, 1955 |